C. E. PIERCE.
Wheel Harrow.
No. 99,946.  Patented Feb. 15, 1870.
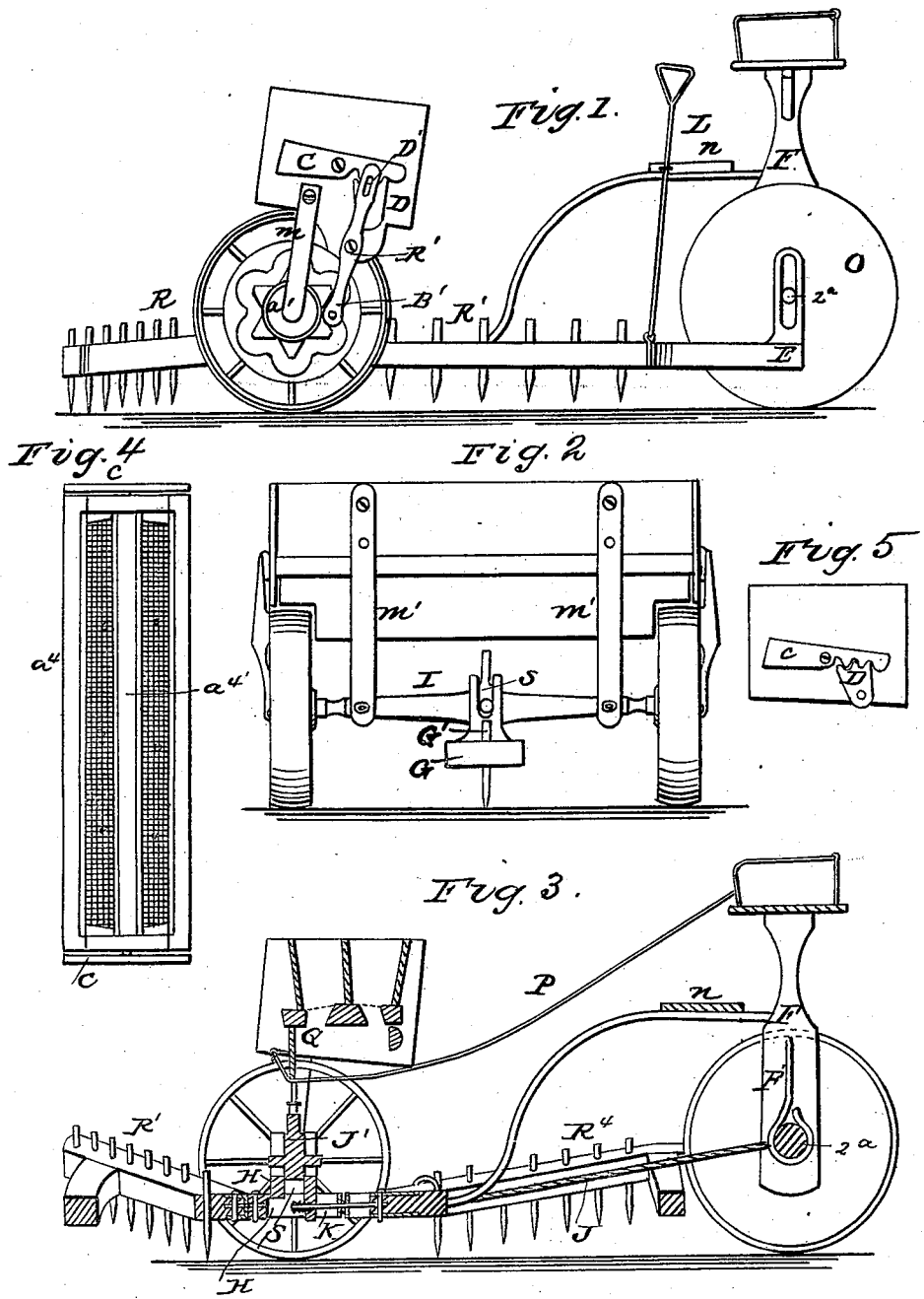
Witnesses  
I. N. Mygatt  
C. de Wilson
Inventor  
Charles E Pierce

United States Patent Office.

CHARLES E. PIERCE, OF NEW YORK, N. Y.

Letters Patent No. 99,946, dated February 15, 1870.

IMPROVEMENT IN COMBINED HARROW, ROLLER, AND SEED-SOWER.

The Schedule referred to in these Letters Patent and making part of the same.

*Know all men by these presents:*

That I, CHARLES E. PIERCE, of the city, county, and State of New York, have invented certain new and useful Improvements in a Combined Harrow, Roller, and Seed-Sower, which is designed to be used on farming lands, in sowing seed of any kind, harrowing it in, and rolling the ground, at one and the same time, thereby being a great saving of labor and expense to the farmer.

The following is a full, clear, and exact description thereof, reference being had to the annexed drawings making a part of the same, in which—

Figure 1 represents the outer side view of the improved combined harrow, seed-sower, and roller.

Figure 2 represents the front view of the hopper, axle, and wheels, also the frame to which the axle is attached.

Figure 3 represents the inside view of the connecting piece or frame which holds the harrow together, also the grooves or slots to which the axle is fastened.

Figure 4 represents the frame on which the sieves are fastened.

Figure 5 represents a side view of one end of the hopper.

Figure 1.

$a^1$, on fig. 1, represents a grooved wheel, which is attached to one of the main wheels on the axle shown in fig. 2. Said grooved wheel may be attached to both of the main wheels on the axle, if desired, for purposes hereinafter set forth.

B, on fig. 1, represents a lever, which is fastened at or near its centre to one side of the hopper, near the bottom of said hopper, and may be fastened to both sides of said hopper, if desired.

A pin, B', is attached or fastened to the lower end of lever B, and projects through on the inside, and is let into the groove on wheel $a^1$.

At the upper end of lever B there is an oblong slot, for purposes hereinafter set forth.

C, on fig. 1, represents another lever, with notches and teeth on the lower side of it, and is fastened on both ends of a sieve hereinafter described.

D, on fig. 1, represents cranks with notches and teeth on the upper ends.

The lower ends of cranks D are fastened to each end of shaft $1^a$, one end of which shaft is shown in fig. 5, and which runs under and through each side of the hopper.

At the upper end of crank D there is a pin, D', attached, which projects out and is inserted into the oblong slot on lever B. The notches and teeth on crank D and lever C are intended to mesh or play into each other, as shown in the drawings.

E, on fig. 1, represents oblong slots made of wood or iron, and are fastened to each back end of the harrow.

Through these slots the ends of shaft $2^a$ are inserted, so that the roller on shaft $2^a$, or either end of the harrow may be raised or lowered or may be moved as required in its working operation.

L, on fig. 1, represents rods which are attached to each side of the back part of the harrow, to raise either side of the same.

F, on fig. 1, represents a standard which is fastened to and braced by F', on each side of said standard F, to shaft $2^a$, at its center. The standard is placed there for the purpose of supporting a seat for the driver.

$n$, on fig. 1, represents a brace or rod to secure and hold the standard F in its place and to support a footboard.

O, on fig. 1, represents the rollers which form a part of the combined harrow, seed-sower, and roller.

R and R', on fig. 1, represent the side view of the two harrows.

Figure 2.

I, on fig. 2, represents the axle, to which are attached the main wheels.

G, on fig. 2, represents the front part or view of a frame which is intended, with the aid of bolts, to hold the harrows together.

G', on fig. 2, represents two standards, with an opening or slot in the center, into which is placed axle I.

$m'$, on fig. 2, represents rods or braces which are attached to the front and back sides of axle I and the hopper, to keep the hopper firmly and secure in its place.

S, on figs. 2 and 3, represents slots or grooves on each of the four sides, for the axle and the pin running through the same to work in.

The fastening of the axle to frame G in this manner allows the harrows, which are fastened to frame G, as before described, to work up and down; also allows the axle to move up and down as may be required in its working operation.

Figure 3.

H, on fig. 3, represents the center view of the frame to which the harrows are fastened.

K, on fig. 3, represents the bolts which fasten the frame H to each harrow.

H', on fig. 3, represents the inside center view of the standards through which run the axle, and is held by a pin, I', which runs through the center of said axle.

Q, on fig. 3, represents a board which is hung on hinges under the hopper.

P, on fig. 3, represents a cord, chain, or rod, which is fastened at one end to a staple attached to the center of the board Q, for the purpose of closing the opening under the hopper, where the grain is intended to come through when desired.

F', on fig. 3, represents the braces which are fastened on each side of shaft 2ª and standard F, for the purpose of holding standard F in its place securely.

J, on fig. 3, represents a rod which is attached on the inside of one end of the harrow R¹, and the other end to the shaft 2ª, for the purpose of holding the rollers O in their place.

R² and R⁴, on fig. 3, represent the inside view of the two harrows, when properly attached.

*Figure 4.*

$a^4$, on fig. 4, represents a frame, and $a^{4'}$ sieves which are fastened into $a^4$. When said sieves are attached to frame $a^4$, the frame is inserted into the hopper, for the purpose of letting grain or seed of any kind through evenly. Said sieves may be used for sowing plaster or any kind of grain, and, when desirable, coarse or fine sieves may be inserted into the frame $a^4$, as the seed may require. When the sieves are arranged in frame $a^4$, the frame is then placed in the hopper. The ends of frame $a^4$ are intended to be inserted into a space made in each end of the hopper, and to each end of the frame $a^4$ are fastened levers C. Should it become necessary to use more than one frame, $a^4$, to work the sieve necessary to accomplish certain objects in sowing seed of different kinds and plaster at the same time, the parts attached to one side of fig. 1, as shown in the drawings, may be attached to the other main wheel on the other side of the hopper, so that two or more frames with sieves attached may be worked independently of each other.

In case it be not necessary to use the front harrow in harrowing the ground, it can be detached, and the horses attached to the ring which runs into the front harrow, and is fastened by a bolt.

In case it be not necessary to use the roller, the pieces or slots E may be unscrewed from each side of the harrow and taken off, so that the rollers may be slipped from shaft 2ª. The slots E are then put back in their places on each side of the harrow, and do not effect the working of the seed-sower or harrow.

The teeth in the harrow behind the hopper are so placed that when the harrow moves in a straight line they will cover the openings made in the ground by the front part of the harrow combination.

The different parts of the harrow, seed-sower, and roller may be made of wood, iron, or of any material best adapted for each part, and when properly made, one wheel, A', on fig. 1, is securely fastened to the main wheel or wheels, and they are attached to axle I.

When lever B is properly attached to the sides of the hopper, and pin B' is attached to lever B, and is inserted into groove on wheel $a^1$, and when pin D', on crank D, is inserted into the slot on the upper end of lever B, and the notches and teeth on crank D are meshed and placed into those on levers C, and when levers C are fastened to each end of frame or frames $a^4$, which project through the sides of the hopper on fig. 2; when said hopper has been properly attached to the axle I, and said axle has been placed into the slot or slots G', on frame G, and when said frame is placed between and fastened to each harrow in front and rear, and when the rollers are connected to the shaft 2ª, and each end of shaft 2ª is inserted in slots E, on each side of the harrow R, and when the different parts of my improved combined harrow, seed-sower, and roller are properly adjusted, and my improved combined harrow, seed-sower, and roller is, by horse or some locomotive power, moved, such motion will cause the sieve to make a rapid motion forward and backward, which will cause the grain when placed in the hopper to work its way out of the sieves, and sow it broadcast on the land, while at the same time the harrow harrows the seed in and the roller rolls the ground, all of which is done at one and the same time, thereby saving to the farmer nearly two-thirds in labor by using the improved "combined harrow, seed-sower, and roller."

Having thus described my improved "combined harrow, seed-sower, and roller," and its working operation,

What I claim as new therein, and for which I desire to obtain Letters Patent, is—

1. The harrow R and R', in combination with the center frame G and G'.

2. The frame G, standard G', and bolts K, which together form the center piece connecting the two harrows, and to which axle I is held, as described.

3. In combination with the harrow and hopper, wheel A', lever B, with pin B' and slot attached, crank D, with pin D' attached, and lever C attached to sieve A⁴, as described and for purposes set forth.

4. The recessed roller and lateral braces F', in combination with the standard E and brace P'.

CHARLES E. PIERCE.

Witnesses:
 T. C. CONNOLLY,
 F. LEHMANN.